United States Patent [19]
Wagensonner et al.

[11] Patent Number: 4,558,436
[45] Date of Patent: Dec. 10, 1985

[54] ARRANGEMENT OF A DYNAMIC RANDOM ACCESS MEMORY

[75] Inventors: Eduard Wagensonner, Aschheim; Wolfgang Ruf; Thomas Landsiedel, both of Munich, all of Fed. Rep. of Germany

[73] Assignee: Agfa-Gevaert AG, Leverkusen, Fed. Rep. of Germany

[21] Appl. No.: 424,971

[22] Filed: Sep. 27, 1982

[30] Foreign Application Priority Data

Oct. 22, 1981 [DE] Fed. Rep. of Germany ....... 3141882

[51] Int. Cl.⁴ ............................................. G11C 11/40
[52] U.S. Cl. .................................... 365/230; 365/189
[58] Field of Search ............... 365/189, 230, 231, 233, 365/238; 340/750, 799

[56] References Cited

U.S. PATENT DOCUMENTS 4,092,728 5/1978 Baltzer ............................ 365/219 X
4,370,712 1/1983 Johnson et al. .................. 365/230 X
4,375,678 3/1983 Krebs, Jr. ............................ 365/238

Primary Examiner—Joseph A. Popek
Attorney, Agent, or Firm—Michael J. Striker

[57] ABSTRACT

The dynamic random access memory for use in a video circuit scanning video images according to the interlaced scanning method and reproducing the images on monitors of different resolutions is described. The RAM memory is composed of as many RAM segments as there are graduations of picture elements available, each segment including a plurality of RAM chips determined by the minimum read/write cycle time and by the scanning cycle time. To speed up the addressing during the switchover from the low-resolution to a high-resolution reception, the memory is organized into two halves, for storing respectively signals pertaining to odd-numbered and even-numbered picture lines. In each half, the vertical columns are subdivided into groups of lines pertaining to a single video data word. The adjoining pairs of columns store the signals pertaining to corresponding pairs of consecutive video lines which, in each pair, are arranged one below the other. In this manner the access time in the memory during the low-resolution is made faster.

5 Claims, 3 Drawing Figures

ARRANGEMENT OF A DYNAMIC RANDOM ACCESS MEMORY

BACKGROUND OF THE INVENTION

The present invention relates in general to dynamic random access memories (RAM) of a high storage capacity for use in connection with a video circuit having a picture pick-up unit which scans lines of picture elements according to the interlaced scanning method, and a receiving unit having two interchangeable monitors of different resolution. The scanned picture elements in the video circuit are converted by an optoelectric converter and an analog-to-digital converter into binary signals coded according to the different graduations of the picture elements. In the receiving unit, the read out signals from the memory are converted in a digital-to-analog converter and applied to the monitors.

SUMMARY OF THE INVENTION

A general object of the present invention is to provide a random access memory having an increased storage capacity to store both a high number of picture elements per address line and to be designed with a high number of address lines.

An additional object of the present invention is to provide such an improved RAM which is applicable not only for high-resolution T.V. monitors but also for standard monitors of lower resolution which are connected to the high-resolution monitor.

A further object of the invention is to provide a video circuit using an RAM of this invention which in the reproduction via standard video devices avoids recharging of video signals from a large-frame memory into memories compatible with standard video resolution.

In keeping with these objects and others which will become apparent hereafter, one feature of the invention resides, in an RAM arrangement of the aforedescribed kind, in the provision of a RAM designed with $n \times n \times 1$ bit-storing locations, which are divided into a first half for storing signals derived from all odd-numbered picture-element lines and in a second half for storing signals corresponding to all even-numbered picture-element lines scanned according to an interlaced scanning method; the RAM is assembled of a plurality of RAM segments depending in number on the number of graduations of scanned signals, each of the RAM segments being assembled of consecutively arranged RAM chips, the number of which is defined by the so-called minimum read/write cycle time of the RAM and by the scanning cycle time, all RAM chips in the memory segments having a plurality of simultaneously addressable address lines and output columns, a write-in control device for writing consecutive signals in each half into consecutive groups of output columns so that upon read-out and reproduction of picture-point signals in monitors having lower numbers of picture lines or lower resolution the control device causes the read out to jump over the consecutive lines in respective halves of the memory.

As know, RAM chips are characterized by a so-called minimum cycle time of their read/write process, which is larger than the so-called picture-point time of a video picture to be reproduced. That means that the memory having a high storage capacity is unsuitable for use in pick-up and reproduction of a video picture because it is too slow. The invention avoids this disadvantage by arranging in a novel manner a plurality of such RAM chips one after the other or side-by-side, such that the consecutive lines and columns of storing locations of respective chips can be addressed or outputted simultaneously. In other words, by selecting a address of an RAM chip, the corresponding addresses in all remaining chips are accessed.

Moreover, the arrangement according to this invention has the advantage that all groups of memory locations in one half pertaining to odd-numbered picture lines, as well as all groups of locations in the other half pertaining to even-numbered picture lines, are separated. In outputting all odd-numbered groups of memory locations during the first reading cycle, and of all even-numbered groups of locations in the second reading cycle, the read out memory locations are simultaneously refreshed. In order to fall below the refreshing time, it is of advantage when the individual lines of memory locations are accessed in the direction of vertical columns at a high speed. The same requirement applies in reading corresponding lines of memory locations for monitors of lower resolution. Due to the fact that, in the memory according to this invention, when the consecutive groups of lines of storage locations pertaining to video signal lines are arranged columnwise one under the other and the lines of memory locations pertaining to video signal lines which are to be jumped over when monitors of lower resolution are used, are arranged side-by-side, a rapid passage through the individual lines of memory locations takes place, even if the individual lines are read at a lower speed. As a consequence of this fast passage, the read-out falls below the permissible refreshing time. The refreshing time is a period in which the stored signals may remain in the memory without fading away of their contents. By applying a proper address to the RAM, the latter refreshes not only a single bit but also all remaining bits stored in the selected RAM line.

According to a further concept of this invention, each group of stored video lines has memory locations in a single column only.

According to another feature of this invention, the number of groups of memory locations for video lines which are arranged one below the other in the assigned columns, both the degree of the lowermost resolution and thus the number of consecutively read groups of memory locations for video lines in the memory are limited by the so-called refreshing time of the dynamic RAM.

In a further embodiment, an input shift register as well as an output shift register are assigned to each RAM segment of the memory, whereby the input shift register has its parallel outputs connected to input lines of respective RAM chips; the output shift register has its parallel inputs connected to the output lines of the RAM chips of individual segments.

In this manner the advantage is obtained that, particularly the picture-element signals occurring simultaneously at the outputs of the RAM chips are applied to the corresponding stages of the shift register in synchronism with the cycle time of the memory; accordingly, the shift register releases the signal for further processing in synchronism with the duration of picture-element signals. According to the number of RAM chips, the signals are read out at higher speed in comparison with the cycle time. The arrangement of this invention also includes a plurality of clock pulse generators coordinated with a given picture resolution of a monitor, the clock generators being connected via multiplexers to synchronization control stages and to addessing stages for the lines and columns of the memory.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
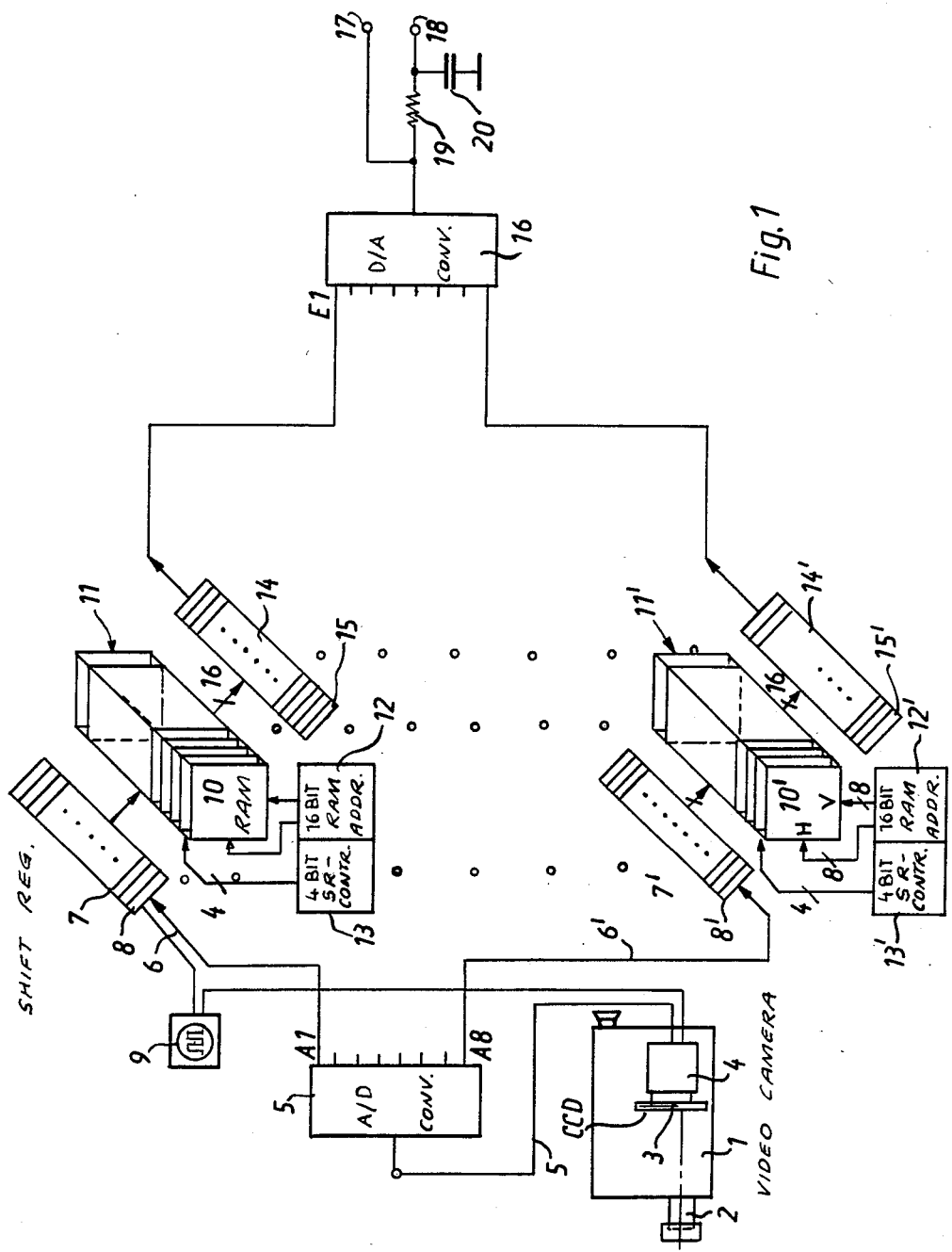
FIG. 1 is a schematic diagram indicating the interfacing of the random access memory of this invention with peripheral devices.

In FIG. 1, reference numeral 1 indicates a video camera projecting through its objective 2 optical images on an optoelectronic converter 3 which is a charge-coupled device (CCD). A signal-processing circuit 4 is connected to the charge-coupled device 3, and applies electrical signals corresponding to scanned picture elements to the input of an analog-to-digital converter 5. Camera 1 operates according to an interlaced scanning method in which the odd- and even-numbered lines of a picture are transmitted one after the other as two separate sets.

The analog-to-digital converter 5 has eight parallel outputs A1–A8 so as to convert the received picture elements into 256 combinations of eight-digit words representing codes of 256 possible gray graduations of each picture element. Each of the outputs A1 to A8 of the analog-to-digital converter 5 is connected via one of serial conduits 6 through 6' to one of series input of a shift registers 7 through 7' each constituted of sixteen series-connected storage stages 8 to 8'. The clock input of each shift register 8 is connected to a clock pulse generator 9 the rate of which corresponds to the scanning frequency of the CCD device 3 of the video camera 1.

Each of the sixteen outputs of the shift register 7 is connected to an assigned read/write memory chip 10 of the RAM so that a pack of sixteen interconnected memory chips can form together a so-called storage segment 11. Each storing chip 10 has eight line-addressing inputs H and eight column-addressing inputs V controlled by a sixteen-bit read/write addressing circuit 12. A four-bit shift register control circuit 13 cooperates with the addressing circuit 12 to control the flow of the requisite information in each of the sixteen storing chips 10. Each storage chip 10 has an output line connected to an assigned input of a storage stage 15 of a parallel-serial shift register 14. More particularly, the shift register 15 has sixteen storing stages 15 connected to corresponding sixteen output lines of the RAM segment 11. A serial output of the shift register 14 is applied to an input of a digital-to-analog converter 16, the output of which is directly connected to a high-resolution video monitor 17 and via a lower-pass filter consisting of a resistor 19 and a capacitor 20, to an output 18 connected to a low (standard)-resolution monitor.

It will be noted that all of the remaining outputs A2 to A8 of converter 5 are connected in the same manner to corresponding RAM segments 11 through 11' provided with the aforedescribed peripheral devices. For the sake of simplicity, FIG. 1 illustrates only a first RAM segment 11 and the last RAM segment 11' assigned to outputs A1 and A8 of the converter 5, respectively.

Each of the read/write RAM segments 11 is structured for storing 1024×1024 picture elements. In each storing chip 10 of the segment there are 256×256 memory locations, so that all of the sixteen storing chips 10 in each RAM segment 11 provides for a storing capacity of $2^{20}$ bits. In this manner, each single bit of a video data word outputted at the analog/digital converter 5 is loaded in the 1024×1024×1 bit storing segment 11. If by means of the addressing circuit 12 an addressing code is applied in parallel to the addressing inputs of the sixteen storage chips 10 of an RAM segment, then the stored information in the form of parallel 16 bits is retrieved at the output lines of each segment and are read out in series by the parallel-series shift register 14 controlled by the shift register control device 13. These sixteen serially read out picture-element signals at each RAM segment 11 form together at the output of respective shift registers 14 a retrieved video data word. In this manner, the RAM arrangement stores and retrieves under a single address a data corresponding to sixteen consecutive picture elements. For the read-out of these sixteen picture elements, a four-bit shift register control circuit 13 is necessary, because in each storing chip 10 a storage capacity of 256×256 ($2^{16}$) storage locations is available. Accordingly, the storage locations are defined by 256 address lines and 256 address columns.

In the camera 1, the charge-coupled device 3 is scanned by means of a motoric drive which preferably operates at a rate of 2 seconds for scanning 1024×1024 picture elements constituting a frame. As mentioned before, by means of the clock pulse generator 9, each digital picture-point signal is clocked in the shift register 7 within 2 microseconds.

Provided that a video half-image requires a cycle time of 20 milliseconds, then for the creation of a complete video picture in a corresponding monitor for 1024×1024 picture elements, a cycle time of 40 milliseconds is necessary. Each picture element thus requires for its processing 32 nanoseconds when taking into account dark scanning intervals.

Figure 2:
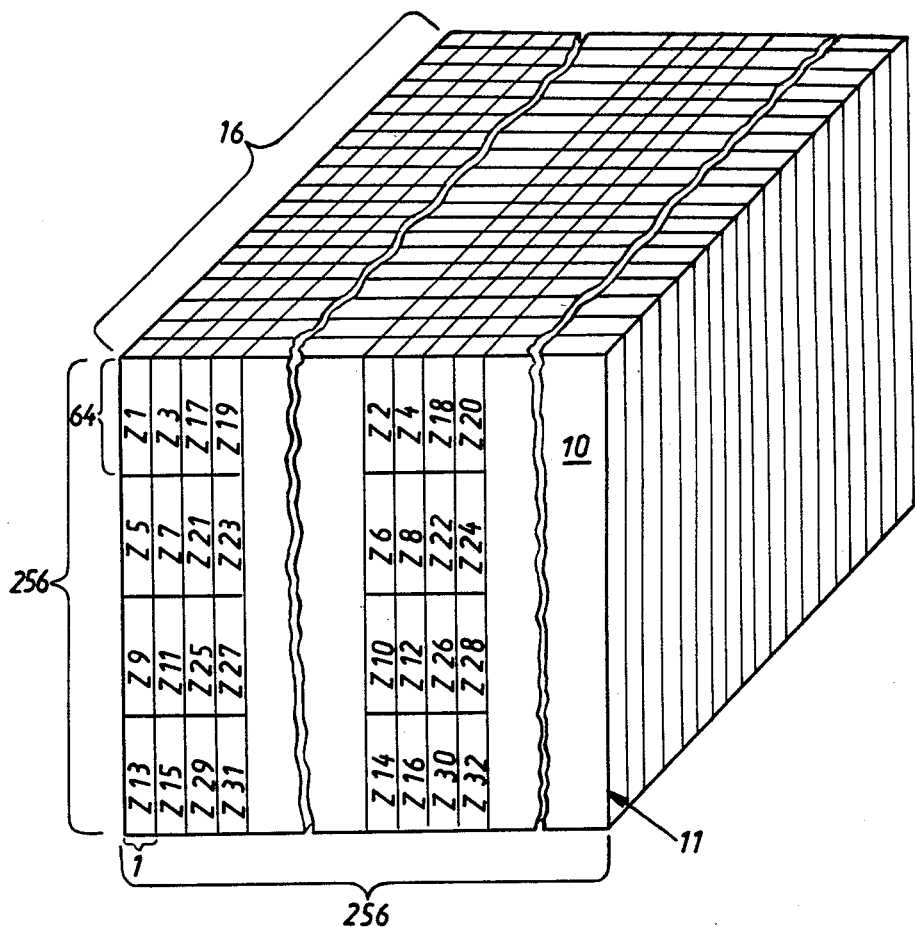
FIG. 2 is a perspective view of portions of the random access memory of this invention.

In FIG. 2 there is illustrated a single RAM segment 11 assembled of sixteen consecutively arranged storing chips 10. Each storing chip 10 includes 256×256 ($2^{16}$) storing locations. Each group of 64 storing locations arranged one below the other in each column of the chip is assigned to a line of the video image. Accordingly, inasmuch as there are sixteen consecutively arranged storing chips 10, 64×16 (1024) memory locations are provided for each video line.

As mentioned before, a video image is scanned by an interlaced scanning method. According to this invention, each storing chip 10 is divided into a first half of vertical columns and into a second half of the columns. Odd-numbered video lines are stored in the first half of the chip, whereas the even-numbered video lines are stored in the second half of the columns.

In the arrangement according to FIG. 1, a high-resolution monitor 17 is provided for reproducing a high-resolution video image, whereas in another operational mode a video image is to be reproduced on a monitor 18 having half of the resolution of monitor 17. In the latter case, for reproducing a video image at half resolution, for each reproduced video line one line remains disregarded. Therefore, in reproducing at full storage capacity on a high-resolution monitor, in a first cycle each first, third, fifth, etc., line and, in the following cycle, each second, fourth, sixth, etc., video line is reproduced, in the half-resolution monitor each third, seventh, eleventh, etc., and subsequently each fourth, eighth, twelfth, etc., stored video line is processed.

If it is desired to selectively or alternately reproduce a video image on a high-resolution monitor or at half resolution, the following arrangement of respective packs of storing locations for video lines is advantageous: The individual packs of storing locations assigned to video lines which are to be reproduced at half-resolution are always arranged one under the other in a single column. That means, in each first column of the chips 10 there are provided sixty-four memory locations for storing the first video line. In FIG. 2, this first pack of sixty-four storing locations arranged below the other in the first column is indicated by Z1. Packs or groups Z1, Z5, Z9, and Z13 are arranged in the first column one below the other and, as mentioned before, pertain to the lines which are to be reproduced one after the other during half-resolution monitoring. In the adjoining second column of respective chips 10, there are arranged one below the other the groups Z3, Z7, Z11 and Z15. In the third column, there are packs or groups Z17, Z21, Z25 and Z29, and in the adjoining fourth column there are storing locations for lines Z19, Z23, Z27 and Z31. In the second half of the storing chip 10, structured for the even-numbered video lines, there are arranged one below the other in the first column the memory locations for video lines Z2, Z6, Z10 and Z14. In the adjoining column, there are packs for the video lines Z4, Z8, Z12 and Z16. Similarly, in the next column, the superposed packs of storing locations are assigned to video lines Z18, Z22, Z26 and Z30, and in the adjoining fourth column are storing locations for video lines Z20, Z24, Z28 and Z32.

This particular organization of storing locations in individual storing chips 10 has the advantage that both during the writing of the signals into and the reading of the signals from the individual packs of storage locations, both for high-resolution and low-resolution reception of the stored signals, very fast acess time is gained for either type of operation.

During the reception on a broadband or high-resolution monitor, accordingly each of the stored original video lines is reproduced, so that in the interlaced scanning after eight video lines the dynamic RAM memory is refreshed. The refreshing takes place after each reading of storing locations pertaining to one line, as necessary in RAM's of this kind. In each case it is necessary to refresh the dynamic RAM every 4 milliseconds. That means that at least once in 4 milliseconds all data stored in all locations of the RAM must be reactivated. In the case of a high-resolution reproduction, the RAM must be reactivated every 8×40 microseconds (320 microseconds). Only in this time interval the refreshing process can be properly performed.

In the standard video operation, each picture element of a video line is scanned and stored; nevertheless, at the output of D/A converter 16 the bandwidth has to be limited by filtering (low-pass filter 19, 20). Since in the low-resolution operation each second originally stored video line is deleted, all line addresses of the RAM are accessed during the time period of 4×64 microseconds (about 250 microseconds) and thus refreshed. This time interval for a refreshing cycle thus distinctly falls below the predetermined minimum time interval of 4 milliseconds.

Figure 3:
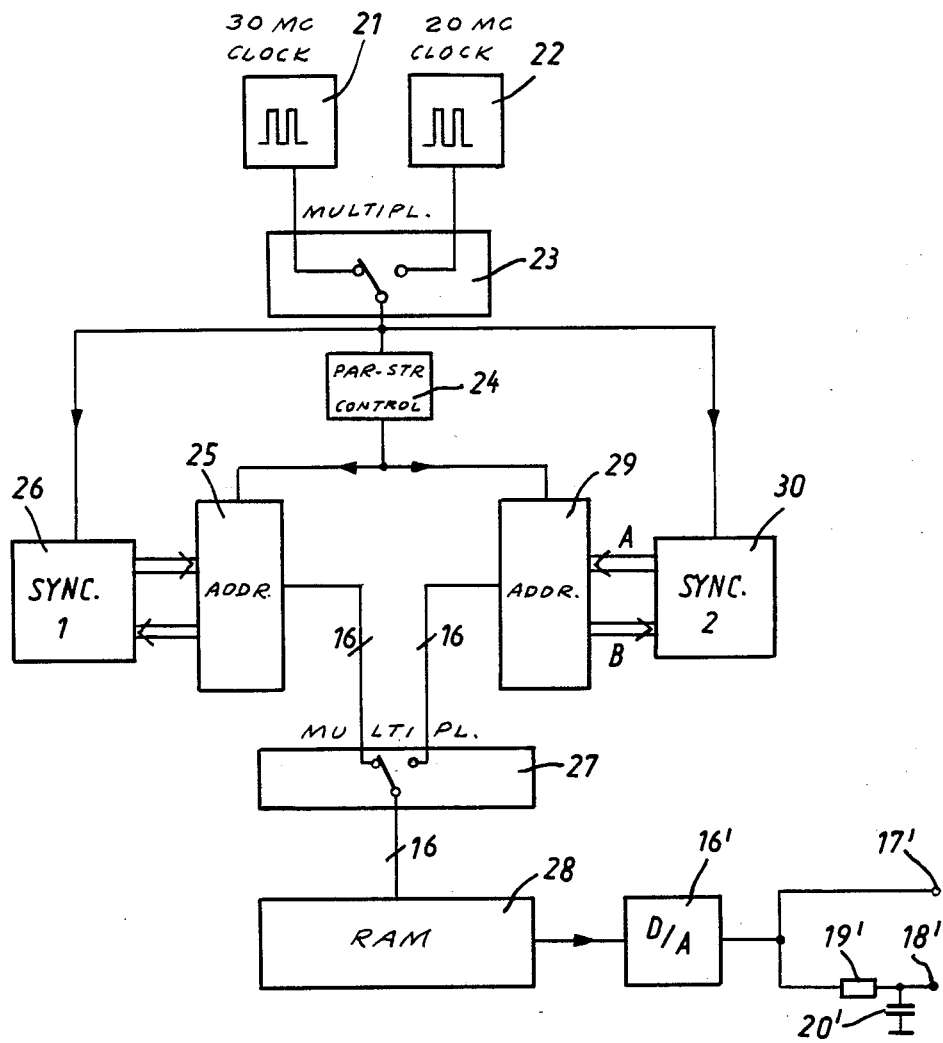
FIG. 3 is a block diagram of an addressing stage for a video signal memory.

In FIG. 3, block circuits corresponding to those illustrated in FIG. 1 are indicated by like reference numerals, provided however with primes. The addressing control circuit depicted in FIG. 2 includes a first clock pulse generator 21 operating at a frequency of 33 megacycles and being used for high-resolution reception of a video image. Another clock generator 22 has a clock frequency of 20 megacycles and is employed for standard reception. Both clock generators 21 and 22 are coupled to a multiplexer 23 which alternately activates or deactivates the two generators 21 and 22. A four-bit parallel-serial control circuit 24 cooperates with the sixteen consecutively arranged RAM chips 10. A sixteen-bit addressing circuit or chain 25 for the individual chips 10 cooperates with a synchronizing circuit 26 via buses A and B. Channel A supplies a flow of signals from the synchronizing circuit 26 to the addressing circuit 25, whereas channel B returns back the confirmation signals. Both circuits 25 and 26 supply synchronizing pulses for horizontal lines and vertical columns, as well as for the horizontal and vertical blanking. In this manner an accurate starting point of each video line and of each video half-frame is determined through the channel A. Confirmatory signals are returned via channel B from the addressing circuit 25 to the synchronizing circuit 26, to determine the end of a line and the end of a half-frame.

The sixteen parallel outputs of the addressing chain 25 are connected to a multiplexer 27, which in turn is connected to the sixteen addressing inputs of RAM 28, corresponding to the eight storing segments 11 according to FIG. 1.

For standard resolution, there is provided an additional addressing chain of circuits 29 connected similarly as circuit 25 via channels A and B to a synchronizing circuit 30. By means of the circuits 29 and 30, which when switched over to the clock 22 make it possible to control the RAM for a standard or low-resolution picture reception, so that a standard monitor permits a clear monitoring of the received image above and below the black level. By means of the low-pass filter 19', 20' the high-frequency video signal is adjusted to the conventional bandwidth of a standard monitor.

It will be understood that each of the elements described above, or two or more together, may also find a useful application in other types of constructions differing from the types described above.

While the invention has been illustrated and described as embodied in a dynamic random access memory for use with a video circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific apsects of this invention.

What is claimed as new and desired to be protected by Letters Patent is set forth in the appended claims:

1. An arrangement of a high-capacity dynamic random access memory for use in a video circuit having a pick-up unit for scanning lines of picture elements according to interlaced scanning method, and a receiving unit having two interchangeable monitors of different resolutions, said arrangement comprising a plurality of RAM segments, the number of which is determined by the number of gradations of picture elements; each segment including a plurality of consecutively arranged RAM chips the number of which is determined by a minimum read/write cycle time and by a scanning cycle time; each RAM chip including $n \times n \times 1$ memory locations arranged in address lines and address columns whereby the memory locations in each segment being simultaneously addressable; means for writing/reading binary signals pertaining to odd-numbered picture-element lines into one half of address columns of each RAM segment and means for writing/reading binary signals pertaining to even-numbered picture-element lines into another half of columns in the RAM segment; control means assigned to respective halves of each segment for writing/reading into consecutive pairs of adjoining columns of storing locations sets of binary signals pertaining to corresponding video lines in each half in such a manner that the consecutively stored sets of signals in adjoining pairs of columns are arranged in pairs side by side and one below the other; and means for switching over the read-out operation to retrieve the stored information from one of the adjoining columns in respective pairs while jumping over the other column.

2. A dynamic random access memory arrangement as defined in claim 1, wherein a predetermined set of memory locations in each column is assigned to a single video line.

3. A dynamic random access memory arrangement as defined in claim 2, wherein the number of sets of memory locations in each column of respective RAM chips is limited by a refreshing cycle time of the memory arrangement.

4. A dynamic random access memory arrangement as defined in claim 2, wherein each segment cooperates with an input shift register and with an output shift register, each of the shift registers having as many stages as there are chips in the memory.

5. A dynamic random access memory arrangement as defined in claim 4, said switching means comprising two clock pulse generators of different frequencies, switchable multiplexing means connected to the clock pulse generators, parallel-serial control means cooperating with addressing circuits and with synchronizing circuits to control the addressing in respective chips of the memory.

* * * * *